UNITED STATES PATENT OFFICE.

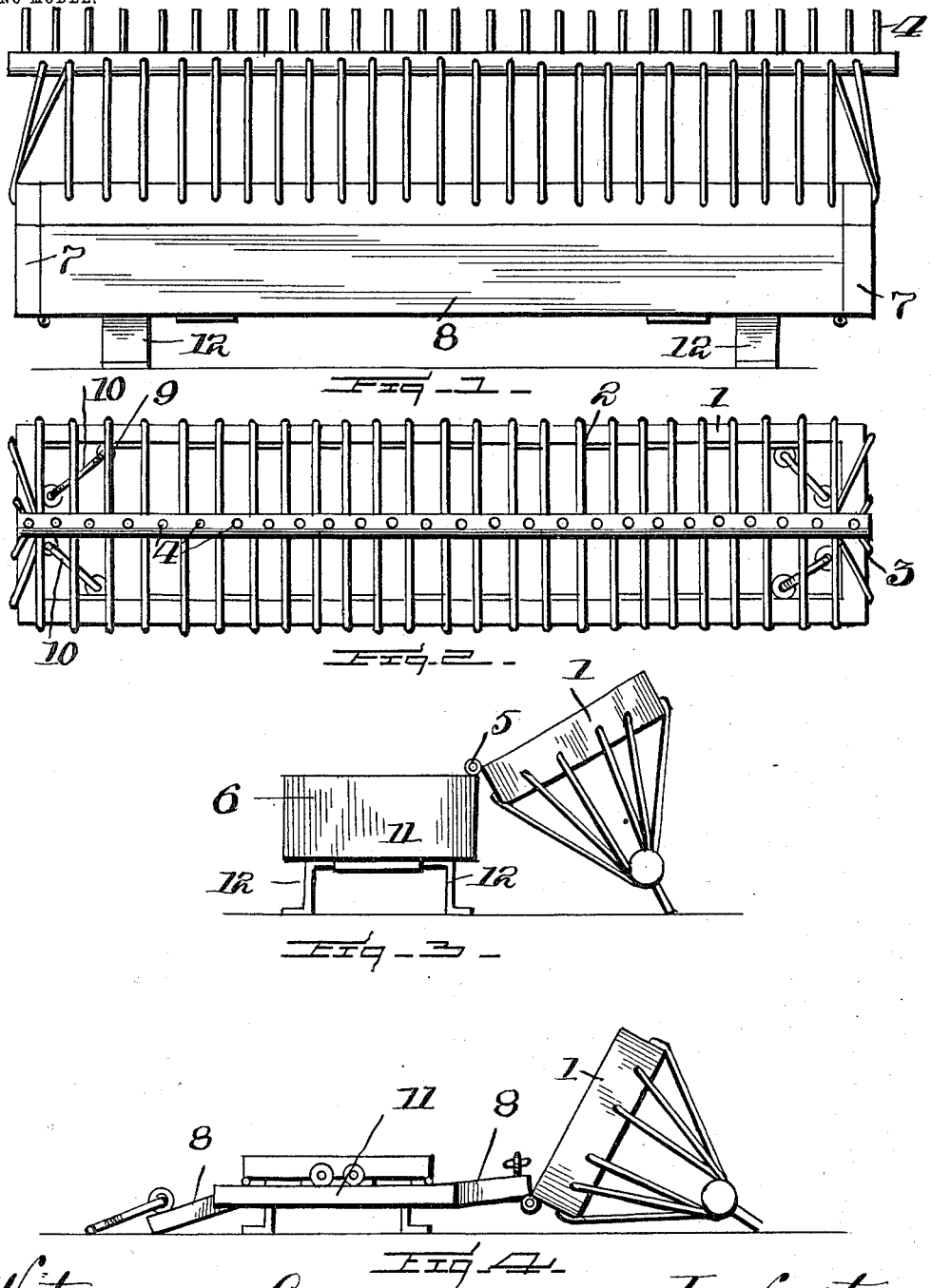

GEORGE C. SPROAT, OF TERRACE, PENNSYLVANIA.

POULTRY FEED-BOX.

SPECIFICATION forming part of Letters Patent No. 719,387, dated January 27, 1903.

Application filed March 21, 1902. Serial No. 99,272. (No model.)

*To all whom it may concern:*

Be it known that I, GEORGE C. SPROAT, a citizen of the United States of America, residing at Terrace, in the county of Allegheny and State of Pennsylvania, have invented certain new and useful Improvements in Poultry Feed-Boxes, of which the following is a specification, reference being had therein to the accompanying drawings.

This invention relates to certain new and useful improvements in feed-troughs, and relates more particularly to that class employed for feeding chickens, poultry, and like birds.

The invention has for its object the provision of novel means whereby a trough may be easily opened and thoroughly cleaned.

Another object of the invention is to provide a folding receptacle that may be easily placed together in position and knocked down when desired.

The invention still further contemplates to provide a device of the above-described character that will be extremely simple in construction, strong, durable, comparatively inexpensive to manufacture, and highly efficient in its use.

With the above and other objects in view the invention consists in the novel construction, combination, and arrangement of parts to be hereinafter more fully described, and specifically pointed out in the claims.

In describing the invention in detail reference is had to the accompanying drawings, forming a part of this specification, and wherein like numerals of reference indicate like parts throughout the several views, in which—

Figure 1 is a front view of my improved trough. Fig. 2 is a top plan view thereof. Fig. 3 is an end view with the top thereof placed in an open position. Fig. 4 is a similar view showing the device in a knocked-down position.

In the drawings the reference-numeral 1 represents a rectangular frame, which forms a cage 2, said cage being composed of wire strands and secured in the central brace 3, the latter having upwardly-extending barbs 4 secured thereon. This frame 1 is hinged at 5 to the body portion of the trough 6, the latter being composed of hinged ends 7 7 and hinged sides 8 8. These sides and ends near the corners are provided with screw-eyes 9 9, carrying hooks 10, which engage the opposite screw-eyes and serve to securely retain the side and end pieces of the trough together. The base 11 of the trough carries suitable supports 12.

The manner of operating my improved feed-trough is as follows: When it is desired to place the feed or grain in the trough, the cage is placed in an open position, as shown in Fig. 3. The cage can then again be placed to its proper position and the birds will have ready access to the food through the wire strands of the cage, as will be readily understood. When it is desired to clean the trough, the cage is first placed in an open position. The hooks may then be disengaged from the opposite screw-eyes and the sides and ends allowed to fold in a manner as shown in Fig. 4 of the drawings. The trough may then be easily cleaned.

The manner of building up my improved trough will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

1. In a feed-trough, the combination with a base, and sides and ends hinged to the base, of means for securing said sides and ends together, a wire cage comprising a rectangular base hinged to one of the said sides, a longitudinal brace arranged above said frame, wire strands secured to the said frame and brace, and upwardly-extending barbs secured to the said longitudinal brace.

2. In a feed-trough, the combination of a base, supports secured to said base, hinged sides and ends, eyelets secured in said sides and ends, hooks to secure said eyelets together, and a hinged cage secured to one of said sides, all parts being arranged and operating substantially as described.

In testimony whereof I affix my signature in the presence of two witnesses.

GEORGE C. SPROAT.

Witnesses:
JOHN NOLAND,
E. E. POTTER.